United States Patent
Ponisch

(10) Patent No.: US 6,540,458 B1
(45) Date of Patent: Apr. 1, 2003

(54) MACHINE-TOOL MILLING CENTER

(75) Inventor: Achim Ponisch, Erdmannsdorf (DE)

(73) Assignee: Heckert Werkzeugmaschinen GmbH, Chemnitz (DE)

( * ) Notice: Subject to any disclaimer, the term of this patent is extended or adjusted under 35 U.S.C. 154(b) by 0 days.

(21) Appl. No.: 09/762,944

(22) PCT Filed: Jul. 28, 1999

(86) PCT No.: PCT/DE99/02317

§ 371 (c)(1),
(2), (4) Date: Mar. 7, 2001

(87) PCT Pub. No.: WO00/09285

PCT Pub. Date: Feb. 24, 2000

(30) Foreign Application Priority Data

Aug. 13, 1998 (DE) .......................................... 198 36 624

(51) Int. Cl.⁷ .............................. B23C 1/12; B23Q 1/48; B25T 11/00
(52) U.S. Cl. .................... 409/201; 74/490.07; 409/211; 409/216; 409/235; 414/733; 901/15
(58) Field of Search ................................ 409/201, 211, 409/216, 235; 74/490.05, 490.01, 490.08, 490.09, 490.07; 414/733; 901/15

(56) References Cited

U.S. PATENT DOCUMENTS

| | | |
|---|---|---|
| 4,435,116 A | 3/1984 | Van Deberg |
| 4,453,883 A | 6/1984 | Bisiach |
| 5,539,291 A * | 7/1996 | Reboulet ............... 318/568.11 |
| 5,787,758 A * | 8/1998 | Sheldon ...................... 408/234 |
| 5,916,328 A * | 6/1999 | Pritschow et al. .......... 414/735 |
| 5,919,014 A * | 7/1999 | Weck et al. ................. 408/236 |
| 6,203,254 B1 * | 3/2001 | Nashiki et al. ............. 409/201 |
| 6,241,437 B1 * | 6/2001 | Wieland ..................... 248/631 |

FOREIGN PATENT DOCUMENTS

| | | |
|---|---|---|
| DE | 9609072 | 9/1997 |
| DE | 19836624 | 2/2000 |
| EP | 0668130 | 8/1995 |
| EP | 0812652 | 12/1997 |
| WO | 9722436 | 6/1997 |
| WO | 0009285 | 2/2000 |

* cited by examiner

Primary Examiner—William Briggs
(74) Attorney, Agent, or Firm—Horst M. Kasper

(57) ABSTRACT

The invention relates to a machine-tool, especially a milling center, comprising a housing (2), a holder (54) for tools and/or workpieces, a coupling guide departing from the housing (2) to guide the holder (54) and a drive device departing from the housing (2) to move and fix the holder (54) guided by the coupling guide. The invention is characterized in that the coupling guide has first means for guiding the holder (54) on a first plane where it brushes over the surface and second means for pivoting the holder 54) on a second plane where it cuts the first plane, wherein the drive device has third means for moving and fixing the holder (54) guided by the coupling guide in an area.

25 Claims, 8 Drawing Sheets

MACHINE-TOOL MILLING CENTER

Figure 1:
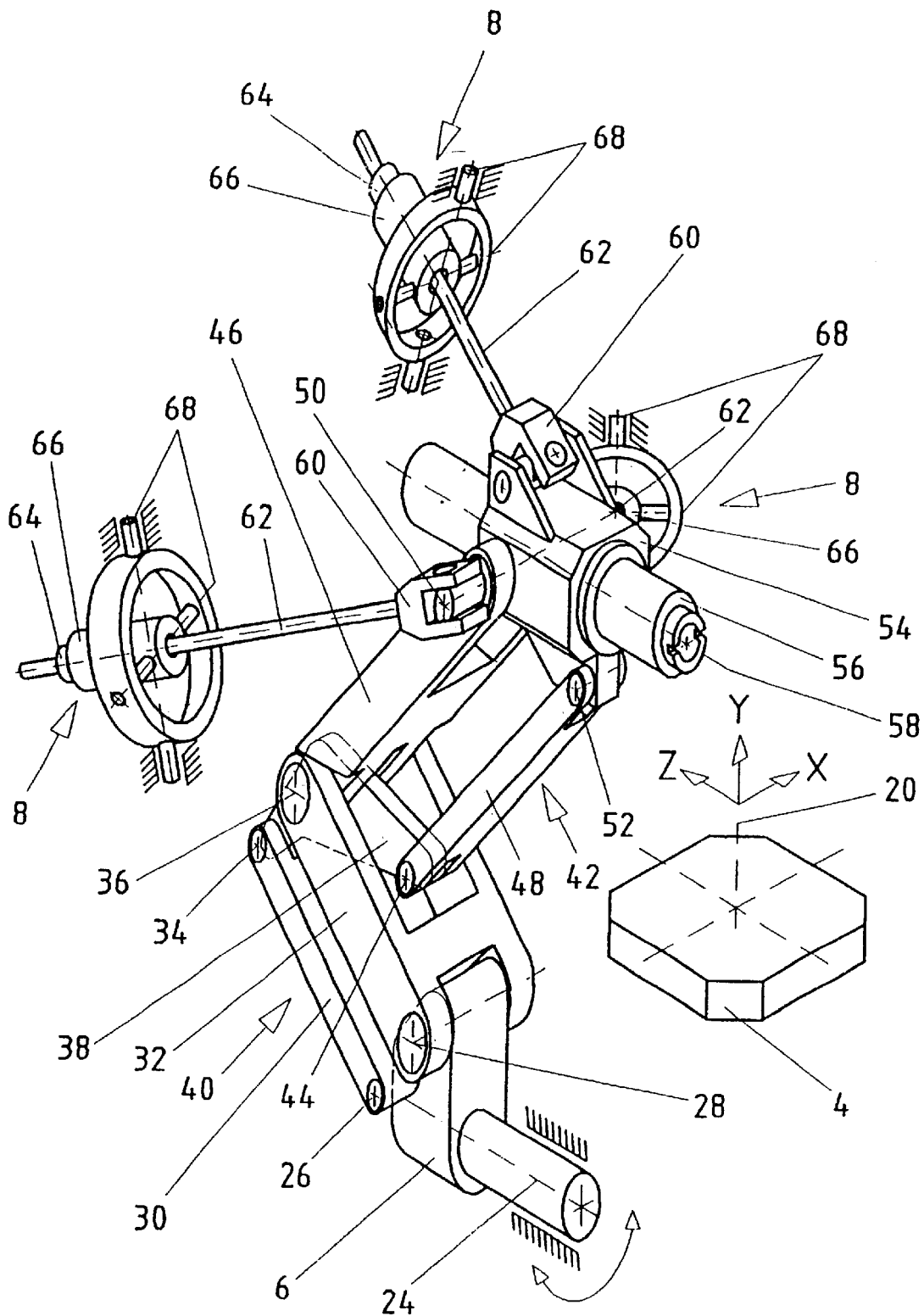

The invention relates to a machine tool, in particular milling center, with a frame, a carrier for tools and/or workpieces, a coupler mechanism guide starting at the frame in order for guiding the carrier, and a drive device starting from the frame for moving and fixing the carrier.

Machine tools with coupler mechanism guided carriers are more flexible, lighter and more dynamic as compared to those machine tools with guide (rail) led carriers, which is based on the one hand on the elimination of the guides extending over the complete course including their foundations and their coverings and strippers and on the other hand on the thereby substantially smaller working surface of guided cards for chips and process auxiliary agents. A known device for the working and/or mounting of tool pieces according to the printed patent document EP 0,812, 652 A1 exhibits a coupler mechanism guide, which allows a planar motion to a carrier adjustable by two linear drives. Motions perpendicular to this plane are realized by center sleeve like or quill like formation of the carrier and/or by separate table motions. Both is again connected with the disadvantages of guide (rail) led carriers, wherein here the guides of the table and/or the center sleeve as well as the associated coverings and strippers are limiting the obtainable speeds and accelerations.

In addition machine tools are known wherein the carrier is guided, moved and fixed by six in each case numerically controlled NC-linear actuators in space. The dispensing with coupler mechanism guides increases the control expenditure, the costs and the space requirements.

It is an object of the present invention to furnish a machine tool of the kind recited, wherein the machine tool is lighter upon realization as of comparable courses and allows higher speeds and accelerations.

This object is accomplished according to the present invention in that the coupler mechanism guide includes first means, in order to guide the carrier in the first plane covering the surface, and includes second means in order to swivel the carrier in a second plane intersecting the first plane, wherein the drive device exhibits third means in order to move and, to fix in position the aligned guided in space. By having each point describable by a Cartesian coordinate triple x, y, z reachable by a coupler mechanism guide movable surface covering in the first plane and swivelable in the second plane, wherein the coupler mechanism guide binds the three degrees of freedom of the rotations around the Cartesian axes x, y, z, which is reachable and is controllable by a drive device starting at the frame, which drive device binds the three degrees of freedom of the displacements along the Cartesian axes x, y, z. There is further required neither a center sleeve like formation of the carrier supporting the tool and/or the work piece nor a corresponding motion to the carrier of a device supporting the workpiece or, respectively, the tool, for example a table or, respectively, a tool holder.

Here the carrier is guidable in the first plane while maintaining the spatial alignment defined by an alignment axis, wherein the first plane comprises preferably the alignment axis. The carrier is preferably supported by the first means, wherein the first means are preferably swingable in the second plane.

The first means comprise at least one parallelogram like four bar chain, preferably at least two to each other connected parallelogram like four bar chains, wherein the first four bar chain starting at the frame is connected to the second four bar chain leading to the carrier and wherein the hinge axes disposed remote from the frame of the two first members of the first four bar chain having equal length and starting from the frame and the hinge axes disposed remote from the carrier of the two second members of equal length leading to the carrier are disposed preferably in a common connecting rod closing one of the four bar chains. This connecting rod or coupler exhibits the three hinge axes, wherein a first member is supported around the first hinge axis, wherein both another first member as well as a second member are supported around the second hinge axis of the coupler, and wherein another second member is supported around the third hinge axis of the coupler. Instead it is also possible to furnish the coupler only with tool hinge axes, wherein both a first member and also a second member are supported around each of the two hinge axes. In addition to, the coupler can also be disposed between the members starting from the frame and/or the members leading to the carrier such that the hinge axes of the coupler exhibit the same distance in each case from the frame bound hinge axes or, respectively, the carrier bound hinge axes. Finally, it is provided to furnish a first member and a second member with a larger cross-section for receiving both pull forces and compression forces as well as bending forces and torsional forces as compared to the in each case other first member and second member, which received only pull forces and compression forces. The second means allow the swivelability of the first means in the second plane. The second means carrying the first means and are swivelable around a swivel axis disposed at the frame, which swivel axis is aligned preferably parallel to the alignment axis. The second means comprise in particular a swivel device or, respectively a swivel body, wherein the swivel body can be swiveled around this swivel axis and carries the first means. The second means can however also be formed as a support of the first means such that for example the four bar chain is swivelable both in the first plane as well as also in the second plane by way of ball and socket joints or universal cardan joints.

The third means exhibit actuators (preferably at least three), wherein the actuators on the one hand are hinged at the frame and on the other hand are hinged at the carrier or at the first means, wherein the hinge distances can be changed for each actuator. They comprise preferably at least three linear actuators changeable in length relative to the frame, wherein the linear actuators are hinged with their one end at frame positions disposed at a distance from each other and are hinged with their other end at the carrier. The joining is performed by a cardan joint and/or by a ball and socket joint. The hinge points are disposed staggered by in each case 120 degrees as seen in the direction of the alignment axis. The actuators or, respectively, the linear actuators enclose an angle of 45 degrees with the alignment axis in a central work point of the carrier and the actuators or, respectively, linear actuators enclose an angle of 90 degrees with the two hinge axes of the cardan joint. The linear actuators preferably comprise in each case a rotary drivable nut and an axially shiftable threaded spindle fixed against rotation, alternatively the linear actuators can also be formed as linear direct drives, as gear rack—gear pinion drives, working cylinders and the like. However, it is also possible to employ actuators which change their hinge distances in a different way, for example by opening or closing tongs like connected arms.

The carrier is preferably formed as a head stock or a drill head, wherein the work spindle receiving tools and/or workpieces is supported in the head stock, wherein the rotary angle position of the work spindle can be corrected, for example by way of software, and wherein the rotary axis of the work spindle preferably coincides with the alignment axis. The carrier can also support however fixed positioned tools and/or workpieces. If the carrier supports a tool, wherein the workpiece received on a work piece table is millable with the tool, then a spatially fixed first casing can arch around the first means and around the second means and around the third means and a second casing foldable away can arch over the work piece table, wherein the first casing and the second casing form together a cockpit like overall casing, wherein at least the second casing is transparent. A weight balancing device can be disposed between two members of the four bar chains, wherein the weight balancing device is preferably formed as a compression spring. An energy feed chain is led in parallel to the four bar chains.

Figure 2:
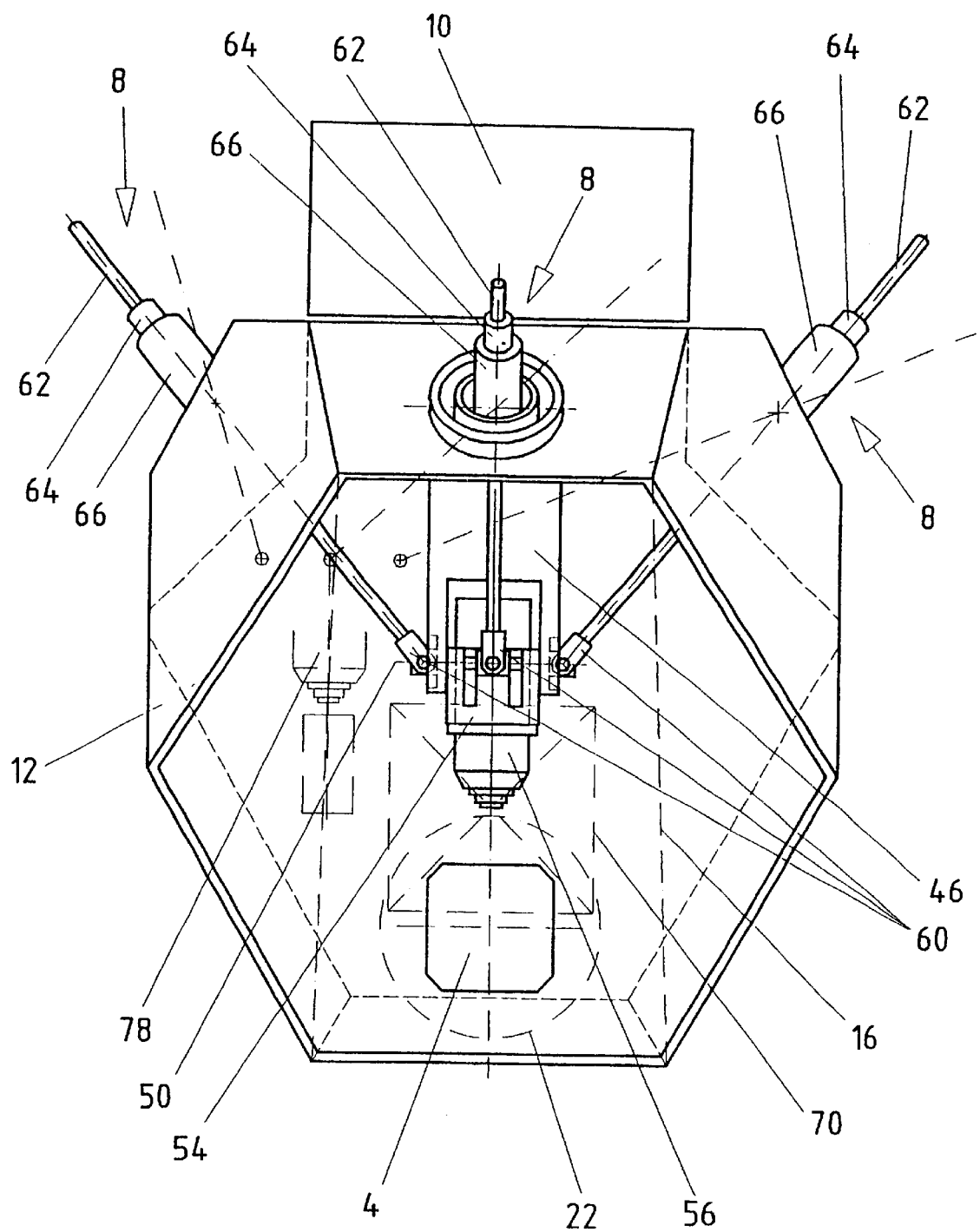
Figure 3:
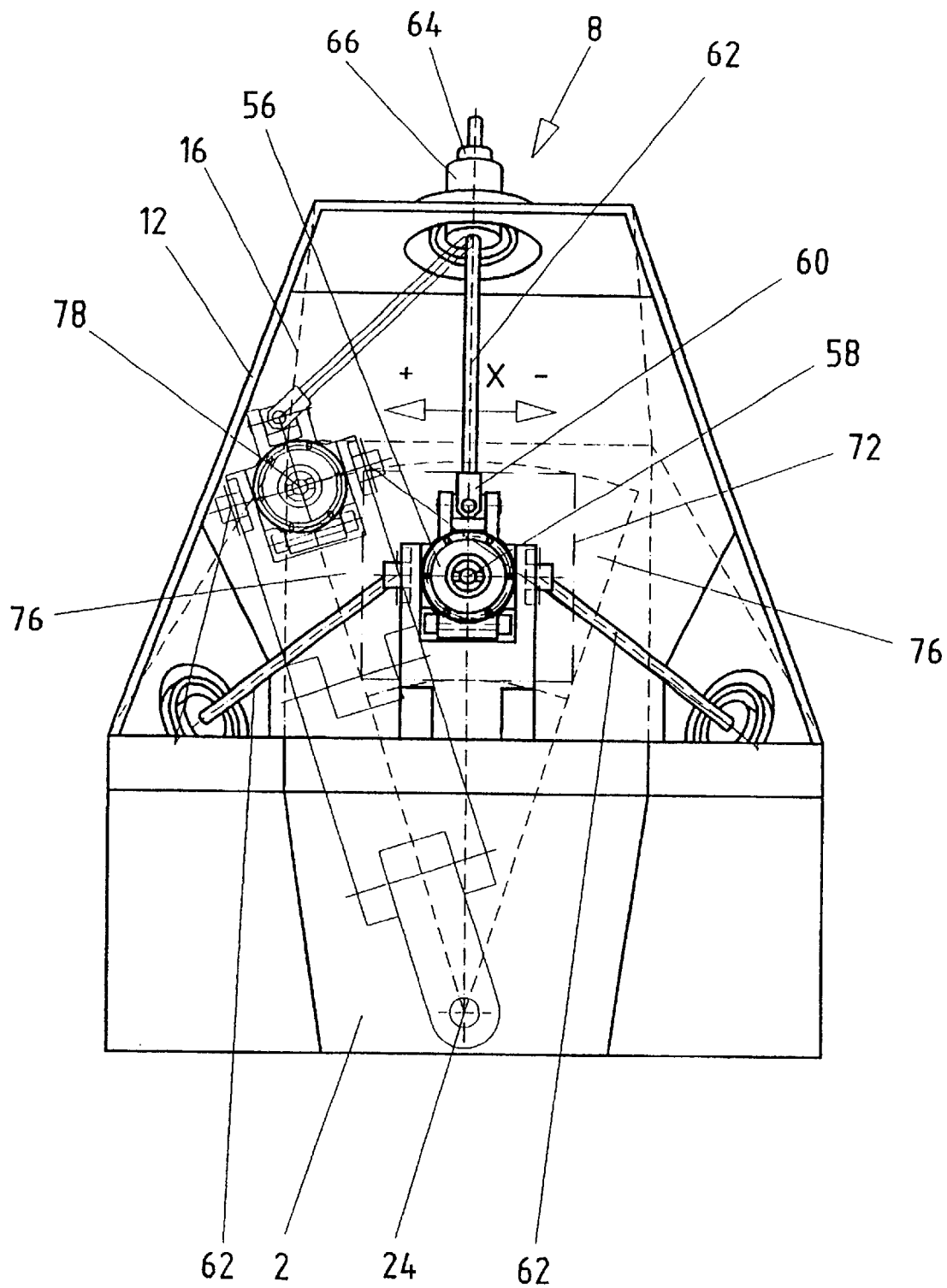
Figure 4:
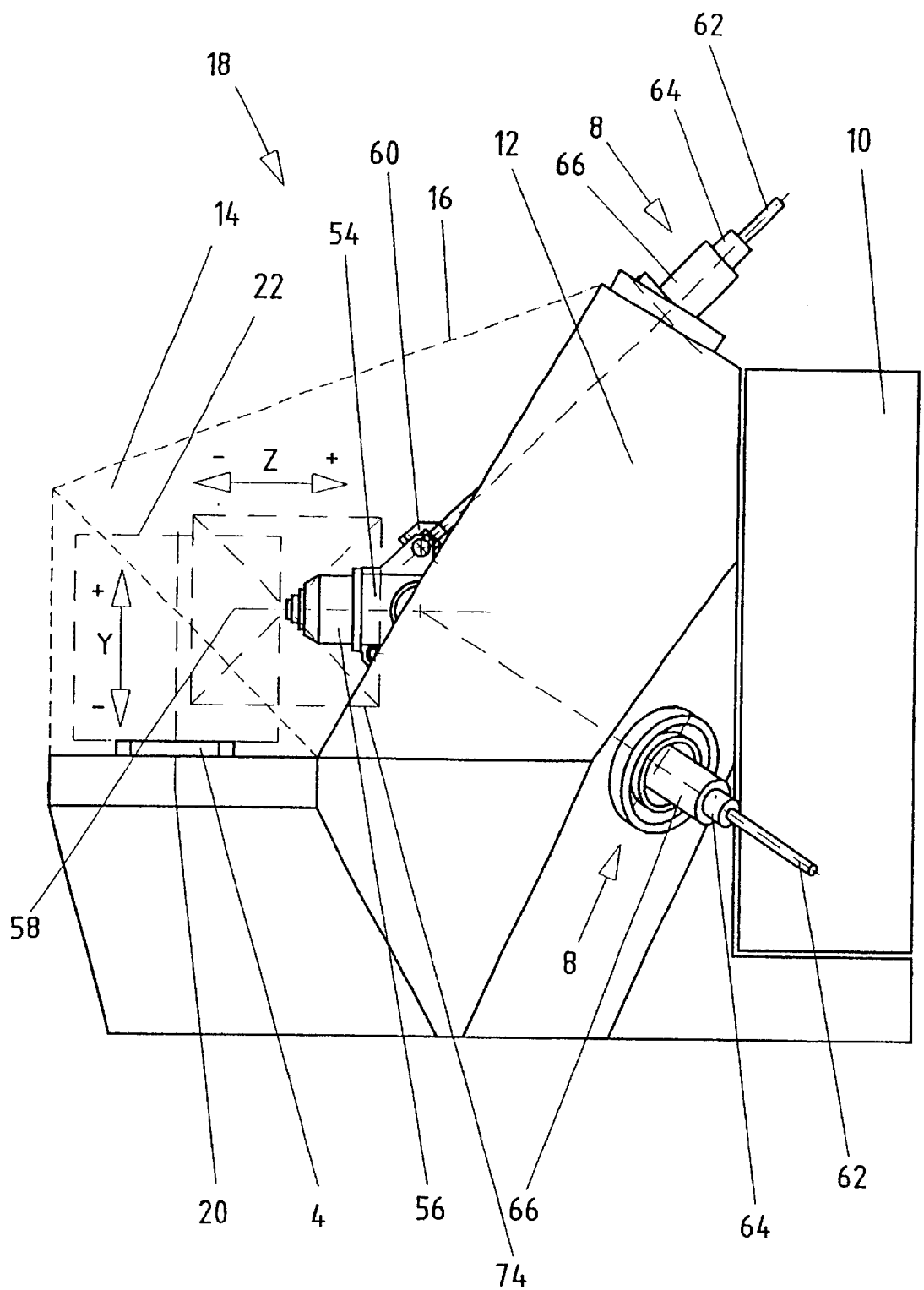
Figure 5:
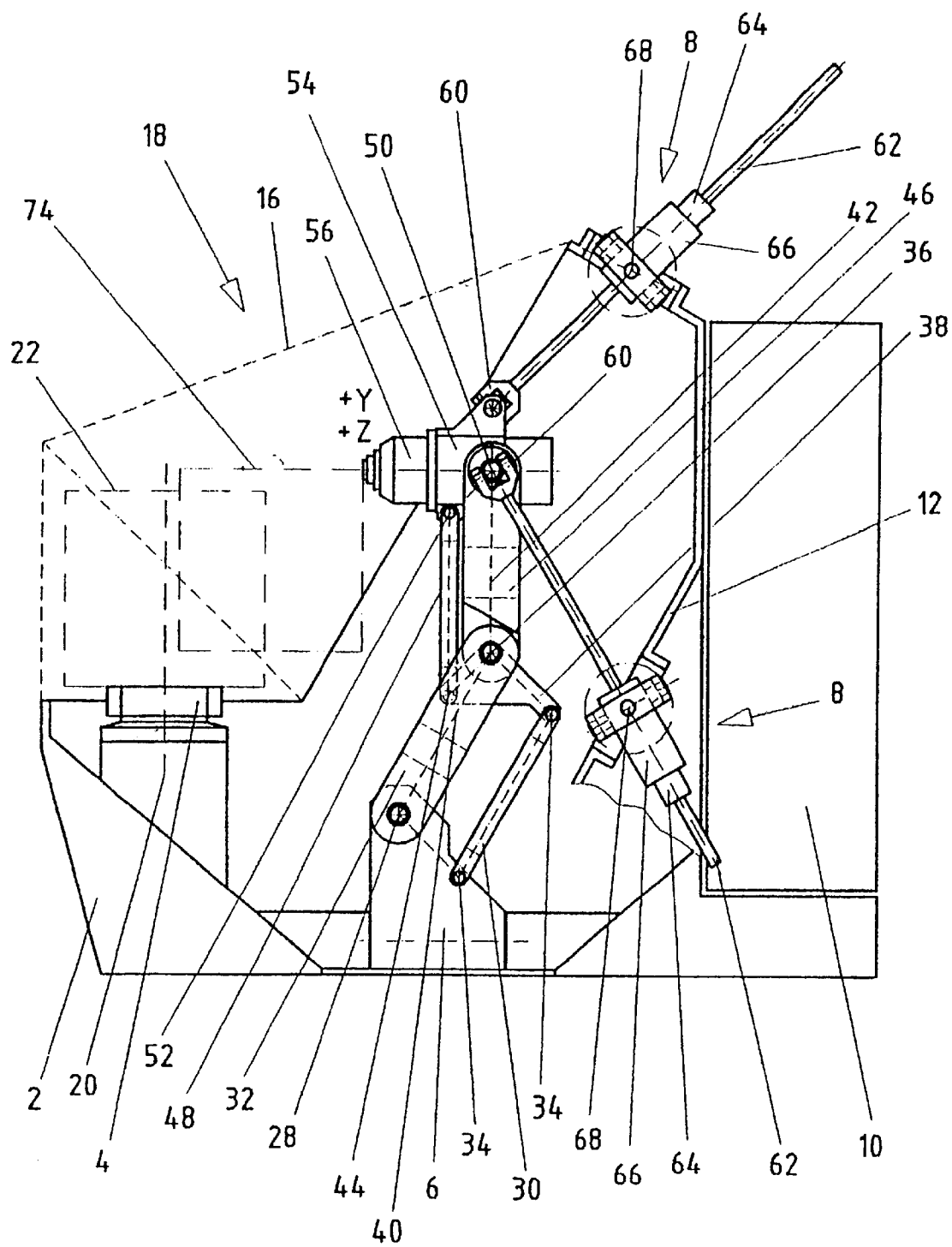
Figure 6:
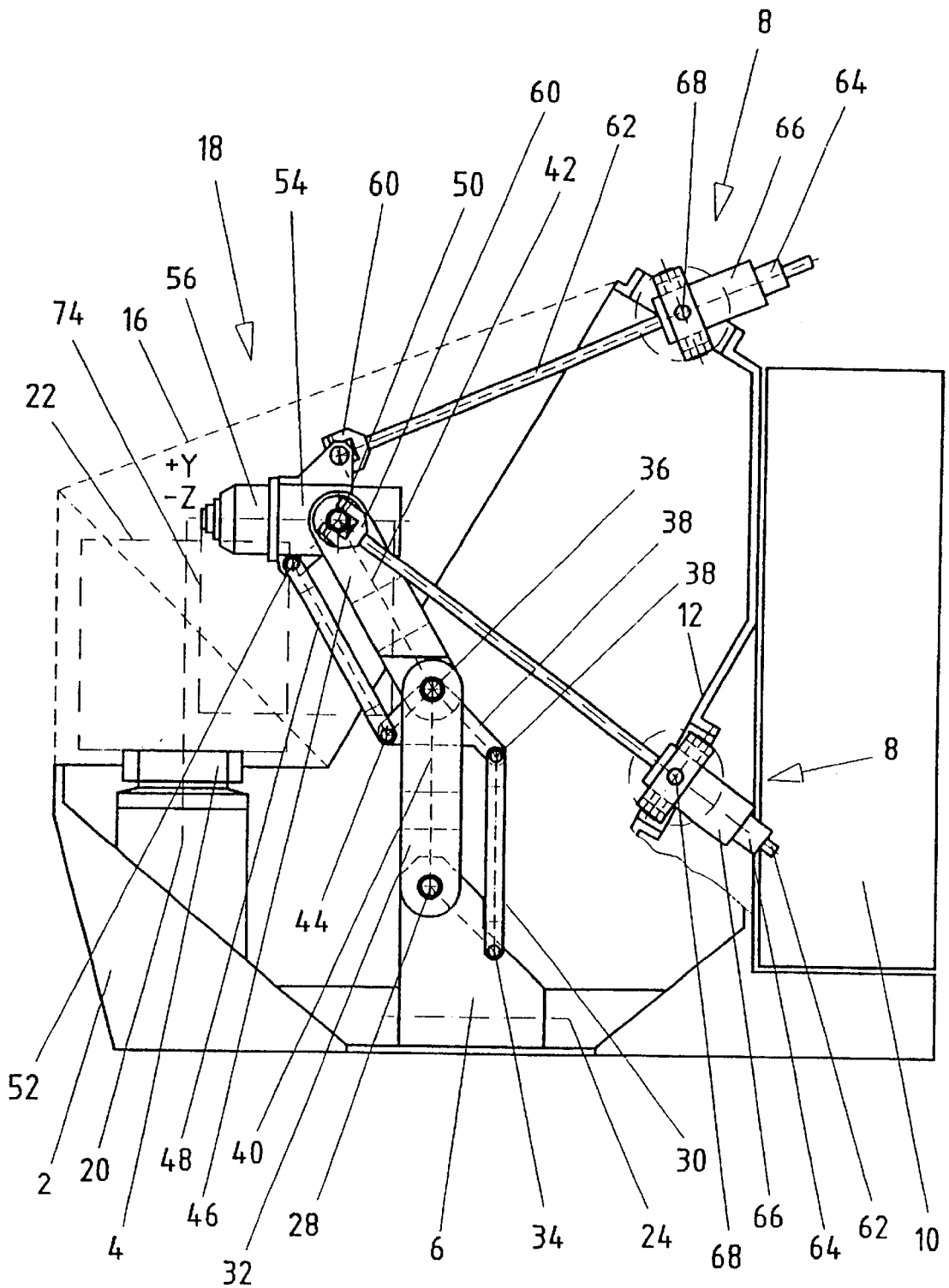
Figure 7:
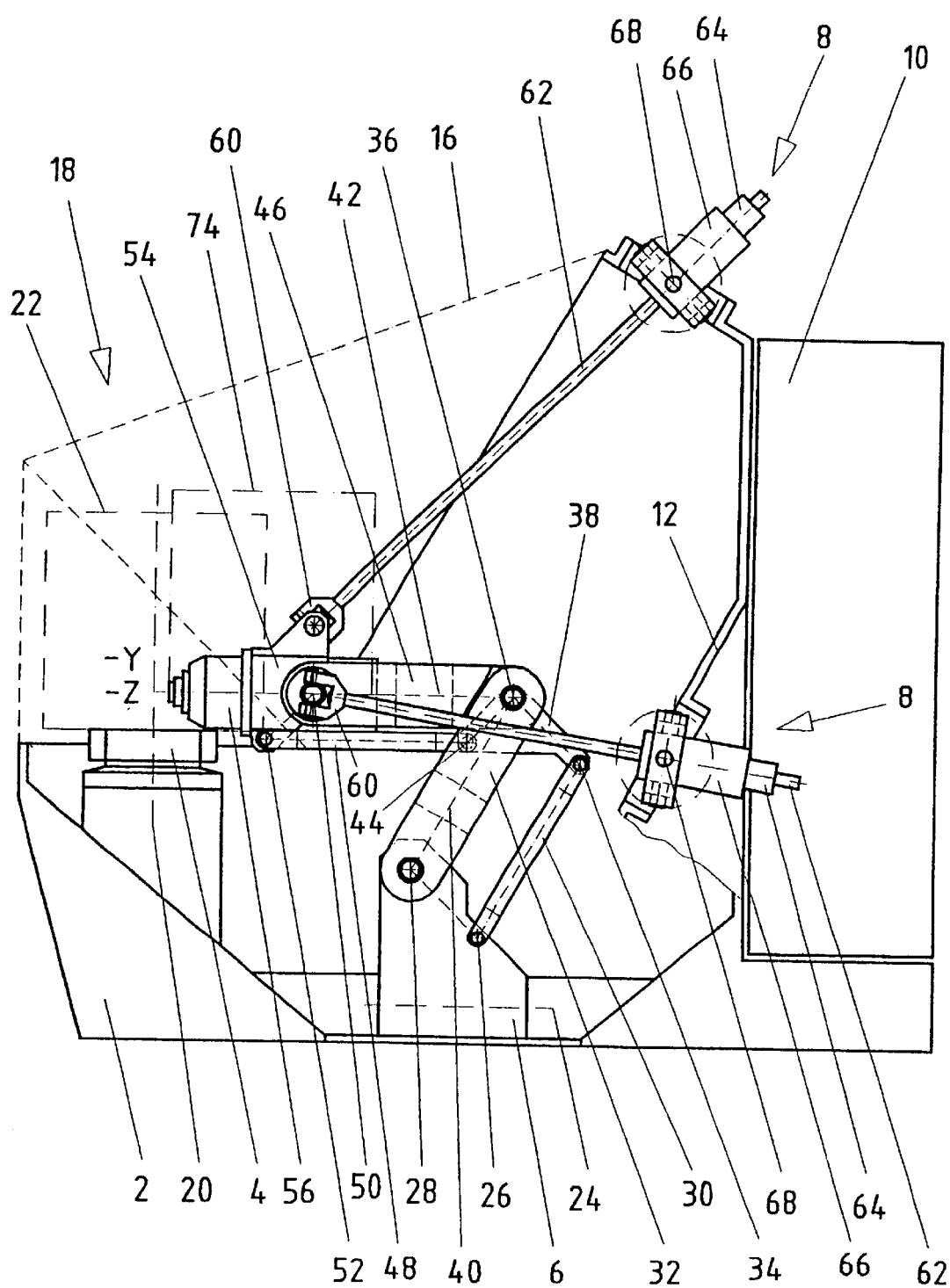
Figure 8:
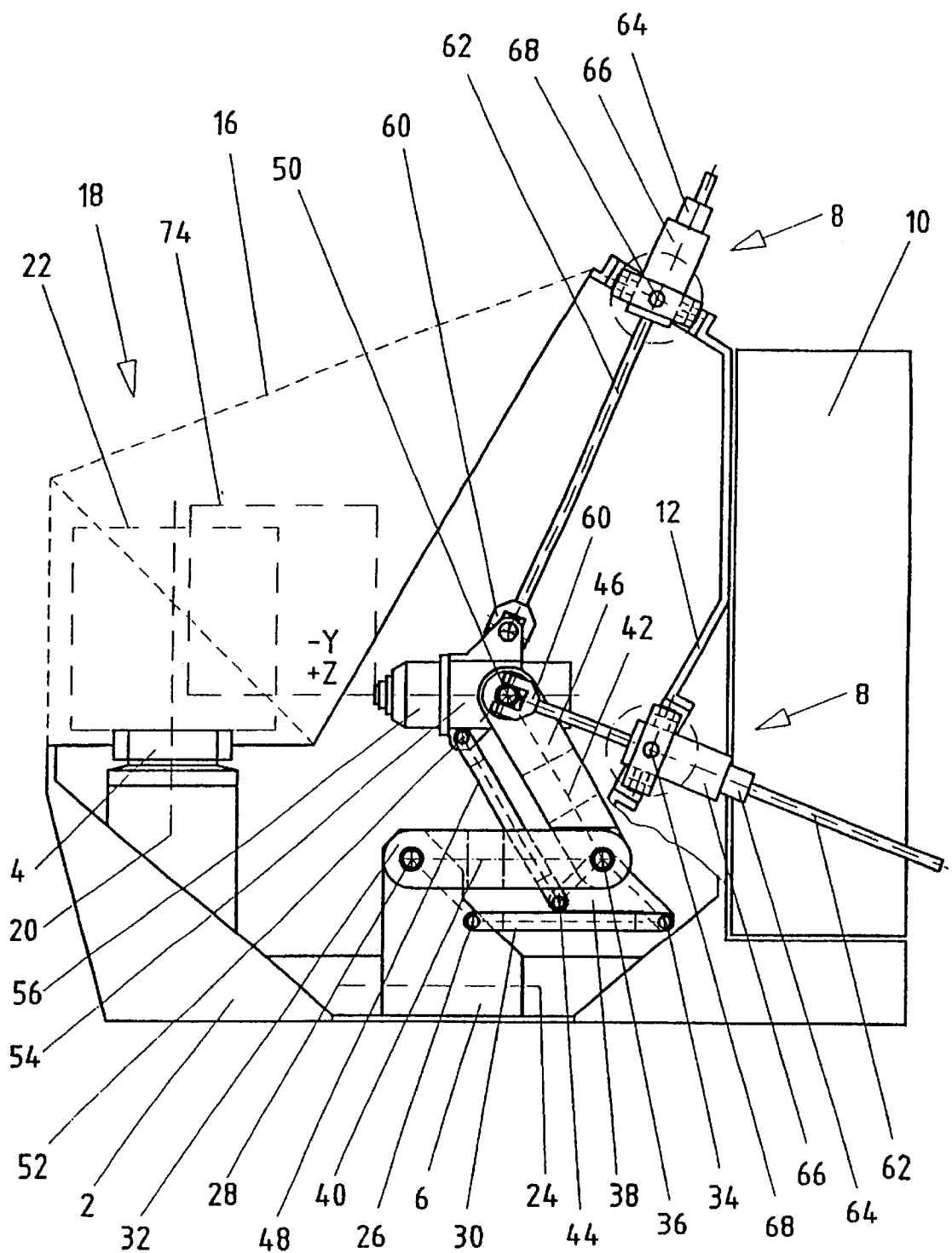

The invention is illustrated in more detail in the following by way of an embodiment. There is shown in the associated schematic drawings:

FIG. 1 a three-dimensional representation of a milling center according to the present invention, wherein the frame and the casing have been left out for reasons of clarity and surveyability, FIG. 2 a top planar view of the milling center, FIG. 3 a front elevational view, FIG. 4 a side elevational view with the spindle (course middle y, z) disposed in the center points of the y-z-working face, FIG. 5 the spindle disposed in a first corner point (+y, +z) of the y-z-working face, FIG. 6 the spindle disposed in a second corner point (+y, z–), FIG. 7 the spindle disposed in a third corner point (–y, z–), and FIG. 8 the spindle disposed in a fourth corner point (–y, +z).

The milling center exhibits a frame 2, which sequentially receives a work piece table 4, a swivel piece 6, three hollow shaft engines 8 and a switch cabinet 10 and which is surrounded by a casing 12, wherein the casing 12 itself can be a component of the frame 2. A transparent platform 16 arches over the workspace 14, wherein the transparent platform 16 together with the casing 12 forms a cockpit 18 and is upwardly flapable.

Possibly the work piece table 4 is rotatable around a vertical rotation axis 20. The work piece table 4 carries a workpiece with a maximum outer contour 22.

The swing piece 6 is swivelable around a horizontal swivel axis 24, wherein the horizontal swivel axis 24 intersects the vertical rotation axis 20 of the work piece table 4.

A fork shaped formed side coupler 30 of small cross-section for receiving of pull forces and compression forces and a main coupler 32 of larger cross-section and formed like a fork of larger cross-section for receiving pull forces, compression forces, bending forces, and torsional forces is supported at its rising section in the direction of the work piece table 4 around swivel axes 26 and 28, wherein the swivel axes 26 and 28 are disposed perpendicular on a plane formed by the rotation axis 20 and the swivel axis 24. A triangular shaped reversing lever 38 is supported at the ends of the main coupler 32 disposed remote from the frame around swivel axes 34 and 36, wherein the swivel axes 34 and 36 are aligned parallel to the swivel axes 26 and 28. The main coupler 30 and the side coupler 32 together with sections of the swivel piece 6 and of the reversing lever 38 form a four bar chain 40, wherein the parallelogram structure of the four bar chain can be derived from the situation that the distance of the axes between the swivel axes 26 and 34 corresponds to the distance of the axes between the swivel axes 28 and 36 and that the distance of the axes between the swivel axes 26 and 28 corresponds to the distance of the axes between the swivel axes 34 and 36.

The reversing lever 38 forms at the same time a member of an also parallelogram like four bar chain 42. For this purpose a fork shape formed main coupler 46 of large cross-section for the receiving of pulling forces, compression forces, bending forces, and torsional forces and a fork shape formed side coupler 48 of the same length and of small cross-section for receiving of pulling forces and compression forces are supported at the reversing lever 38 around the swivel axis 36 and around the swivel axis 44 disposed parallel to the swivel axis 36, while at the other ends of the coupler there is disposed a spindle stock 54 with an engine spindle 56 around swivel axes 50 and 52, wherein the swivel axes 50 and 52 are aligned parallel to the swivel axes 36 and 44, wherein the rotation axis 58 of the engine spindle 56 runs parallel to the swivel axis 24 of the swivel piece 6. By having the distance of the axes between the swivel axes 36 and 50 correspond to the distance of the axes between the swivel axes 44 and 52 and by having the distance of the axes between the swivel axes 36 and 44 correspond to the distance between the axes 50 and 52, the four bar chain 42 comprising a main coupler 46 and a side coupler 48 as well as sections of the reversing lever 38 and of the spindle stock 54 forms a parallelogram.

Overall three threaded spindles 62 fixed against rotation are hinged at the spindle stock 54 at the cover face and two side faces with the aid of cardan joints 60, wherein the three threaded spindles 62 are running in rotary driven spindle nuts 64 of the quill motors 8 on the site of the frame, wherein the casings 66 of the quill motors 8 are hinged with the aid of cardan joints 68 at the frame 2. The pivotal points on the side of the frame are disposed in each case staggered by 120 degrees as seen from the front onto the motor spindle 56.

If the front edge of the motor spindle 56 is disposed in an intersection point of the spatial diagonal of a drivable workspace delimited by planes (x-y, x-z, y-z) disposed perpendicular to each other, then the threaded spindles 62 with the rotation axis 58 of the motor spindle 56 enclose an angle of 45 degrees and in each case an angle of 90 degrees with the two hinge axes of the cardan joints 68. The workspace is designated in the x-z plane with reference character 70 in FIG. 2, the workspace in the x-y plane is designated with the reference character 72 in FIG. 3 and the workspace in the y-z plane is designated with reference character 74 in FIGS. 4 through 8. It can be recognized from figures and 3 that two drivable edge regions 76 exist in addition to the drivable cubic workspace, wherein the two drivable edge regions 76 are reserved to the tool and/or workpiece change. A motor spindle disposed in change position is designated with reference character 78 in FIGS. 2 and 3.

An energy chain not shown is led parallel to the four bar chain 40 and 42, wherein the energy chain supplies energy to the motor spindle 56. A compression spring not shown and hinged between the swivel axes 52 and 28 provides for weight balancing.

The mode of operation is as follows:

All threaded spindles 62 are entered in a rear upper position of the motor spindle 56 (FIG. 5), and the couplers 30 and 32 have their largest mutual distance and the couplers 46 and 48 have their smallest mutual distance.

In order to move the motor spindle out of this position along the rotary axis of the motor spindle in a z-direction, the spindle nuts 64 are rotated such in the same sense by the quill motors 8 that the therein received threaded spindles 62 fixed against rotation escape symmetrically in the direction of the workspace 14 (relative to the y-z plane), which does not mean anything else than that the threaded spindles increase their length relative to the frame. Alternatively this could also be performed by telescope arrangements, gear pinion—gear rack pairs, work cylinders and the like. The motor spindle 56 carries along the four bar chains 40 and 42 during its travel in z-direction, wherein the couplers 30 and 32 raise vertically under reduction of their mutual distance and wherein the couplers 46 and 48 tilt in the direction of the workspace 14 under increase of their mutual distance without that the in each case other oppositely disposed members of the parallelogram like four bar chains 40 and 42 such as the reversing lever 38 and the motor spindle 56 change their alignment.

In order to move the motor spindle 56 from the position shown in FIG. 6 downwardly in y-direction, the upper threaded spindle 62 is moved out in the manner already described and the two other threaded spindles 62 are symmetrically moved in (relative to the y-z plane) by reversing the rotation direction of the quill motor 8. Here the four bar chains 40 and 42 connected to each other are carried along, wherein the couplers 30 and 32 tilt back again into their starting position under increasing of their mutual distance and wherein the couplers 46 and 48 further tilt forwardly under decrease of their mutual distance. Here again the alignment of the reversing lever 38 and of the motor spindle 56 is maintained.

In order to move the motor spindle 56 from the position shown in FIG. 7 along the rotation axis of the motor spindle 56 in the position shown in FIG. 8, all threaded spindles 62 are moved in symmetrically (relative to the y-z plane) by the already described away, wherein the four bar chains 40 and 42 are carried along in the similarly described fashion.

Also all other positions can be set correspondingly in the y-z plane by symmetrical moving out and moving in of the threaded spindles 62.

If the threaded spindles 62 (with respect to the y-z plane) are moved in and are moved out non-symmetrically, then the motor spindle 56 is also moved in the x-direction disposed perpendicular to be y-z plane, wherein the swivel piece 6, which swivel piece 6 carries the connected four bar chains 40 and 42 including motor spindle 56, swivels around the swivel axis 24 such that the four bar chains of the motor spindle standing representative for other first means do not follow any longer in the y-z plane, but in a correspondingly swung out swivel plane. In this section each space position describable by the coordinate triples x, y, z can be set actively by only three threaded spindles 62 capable of changing length relative to the frame 2, whereas the motor spindle 56 is supported on the only passively following four bar chains 40 and 42, wherein the four bar chains 40 and 42 rest on the swivel piece 6. The threaded spindles 62 received in the spindle nuts bind the three degrees of freedom of the shiftings along the Cartesian axes in work sharing and the four bar chains 40 and 42 as well as the swivel piece 6 bind the three degrees of freedom of the rotations around the Cartesian axes. Compensation means not illustrated take care that the position of the rotary angle of the motor spindle remains intact upon swiveling around the swivel axis 24. They rotate the motor spindle in a sense opposite to the swivel motion.

What is claimed is:

1. A machine tool with
   a frame (2),
   a carrier (54) for tools and/or workpieces,
   a coupler guide starting from the frame (2) in order to guide the carrier (54) while maintaining the special alignment of the carrier (54) defined by an alignment axis (58) disposed in a first plane, and a drive device starting from the frame (2), in order to move and to fix the coupler guided carrier (54), wherein at least three actuators changeable in length relative to the frame (2) are hinged with their first ends at frame positions disposed at a distance from each other and are hinged with their second ends at the carrier (54) and wherein the coupler guide supporting the carrier (54) has at least two parallelogram like first and second four bar chains (40,42) connected to each other and swivelable in a second plane intersecting the first plane around a swivel axis (24) disposed parallel to the alignment axis (58) characterized in that
   the first four bar chain (40) emanating from the frame (2) with an end disposed remote from the frame and the second four bar chain (42) emanating from the carrier (54) with an end located remote from the carrier are disposed with said ends in a common coupler (38) exhibiting three hinge axes (34, 36, 44);
   wherein a first member (30) of the first four bar chain (40) is supported around a first hinge axis (34) of the coupler (38), wherein a second member (32) of the first four bar chain (40) and a first member (46) of the second four bar chain (42) are supported around a second hinge axis (36) of the coupler (38), and wherein a second member (48) of the second four bar chain (42) is supported around a third hinge axis (44) of the coupler (38).

2. The machine tool according to claim 1, wherein each member (30, 32) of the first four bar chain (40) and each member (46,48) of the second four bar chain (42) is movable between a horizontal position and a vertical position.

3. A machine tool comprising a frame (2),
   a carrier (54) for tools and/or workpieces,
   a coupler guide starting from the frame (2) to guide the carrier (54) by maintaining a defined spatial alignment of an alignment axis (58) disposed in a first plane, and wherein the coupler guide supporting the carrier (54) has at least two parallelogram like first and second four bar chains (40,42) connected to each other and swivelable in a second plane intersecting the first plane around a swivel axis (24) disposed parallel to the alignment axis (58);
   a drive device starting from the frame (2) in order to move and fix in position the coupler guided carrier (54),
   at least three actuators changeable in length relative to the frame (2) hinged with their first ends at frame positions disposed at a distance from each other and hinged with their second ends at the carrier (54);
   and wherein the first four bar chain (40) emanating from the frame (2) with an end disposed remote from the frame and the second four bar chain (42) emanating from the carrier (54) with an end located remote from the carrier are disposed with said ends in a common coupler (38) exhibiting three hinge axes (34, 36, 44);
   wherein a first member (30) is supported around a first hinge axis (34) of the coupler (38), wherein both another first member as well as also a second member (32, 46) are supported around a second hinge axis (36) of the coupler (38) and wherein another second member (48) is supported around a third hinge axis (44) of the coupler (38).

4. The machine tool according to claim 1, wherein the three hinge axes (34,36,44) form the corner points of a right angle triangle on the coupler (38) in a plane running perpendicular to the three hinge axes, wherein the right angle is disposed at the hinge axis (36) receiving both the first member (46) of the second four bar chain (42) as well as the second member (32) of the first four bar chain (40).

5. The machine tool according to claim 1, wherein the first and second hinge axes are disposed remote from the frame and wherein said first and second members (30,32) have the same length, and the two members (46,48) leading to the carrier (54) and hinge axes disposed remote from the carriers being of the same length and are connected to a common coupler (38) connecting the first aid second four bar chains (40, 42).

6. A machine tool with a frame (2), a carrier (54) for tools and/or workpieces, a coupler guide starting from the frame (2) to guide the carrier (54) by maintaining a defined spatial alignment of an alignment axis (58) disposed in a first plane and a drive device starting from the frame (2) in order to move and fix in position the coupler guided carrier (54), characterized in that at least three actuators changeable in length relative to the frame (2) are hinged with their ends at frame positions disposed at a distance from each other and are hinged with their second ends at the carrier (54); and wherein the coupler guide supporting the carrier (54) has at least two parallelogram like first and second four bar chains (40, 42) connected to each other and swivelable in a second plane intersecting the first plane around a swivel axis (24) disposed parallel to the alignment axis (58) and wherein the first four bar chain (40) emanating from the frame (2) with an end disposed remote from the frame and the second four bar chain (42) emanating from the carrier (54) with an end located remote from the carrier are disposed with said ends in a common coupler (38) exhibiting three hinge axes (34, 36, 44);

and wherein a first member (30) is supported around the first hinge axis (34) of the coupler (38), wherein both another first member as well as also a second member (32, 46) are supported around the second hinge axis (36) of the coupler (38) and wherein another second member (48) is supported around the third hinge axis (44) of the coupler (38).

7. The machine tool according to claim 1, characterized in that an energy feed line is guided in parallel to at least one of the four bar chains (40,42).

8. Machine tool according to claim 1, characterized in that the four bar chains (40,42) are disposed in a first plane and/or in planes disposed parallel to the first plane.

9. The machine tool according to claim 6, wherein the first and second hinge axes are disposed remote from the frame and wherein said first and second members (30,32) have the same length, and the two members (46,48) leading to the carrier (54) and hinge axes disposed remote from the carriers being of the same length and are connected to a common coupler (38) connecting the first and second four bar chains (40, 42).

10. Machine tool according to claim 9, wherein a first member (30) is supported around the first hinge axis (34) of the coupler (38), wherein both another first member as well as also a second member (32, 46) are supported around the second hinge axis (36) of the coupler (38) and wherein another second member (48) is supported around the third hinge axis (44) of the coupler (38).

11. The machine tool according to claim 1, characterized in that the coupler (38) redirects the alignment of the second four bar chain (42) relative to the alignment of the first four bar chain (40).

12. The machine tool according to claim 1, characterized in that the first member (46) of the second four bar chain (42) and the second member (32) of the first four bar chain (40) exhibit a larger cross-section for receiving both pulling forces and compression forces as well as bending forces and torsional forces as in each case the other first member or, respectively, other second member (30,48) receive only pulling forces and compression forces.

13. The machine tool according to claim 1, characterized in that the four bar chains (40,42) are supported by a swivel body (6), wherein the swivel body (6) is swivelable around a hinge axes (24) disposed parallel to the alignment axis.

14. The machine tool according to claim 1, characterized in that the actuators are hinged by a cardan joint and/or by a ball and socket joint.

15. The machine tool according to claim 1, characterized in that the hinged points of the actuators are disposed staggered by 120 degrees as seen in the direction of the alignment axis.

16. The machine tool according to claim 1, characterized in that a central working point of the carrier (54) is disposed in an intersection point of workspace diagonals, wherein the actuators enclose an angle (58) of 45 degrees with the alignment axis.

17. The machine tool according to claim 1, characterized in that a work point of the carrier (54) is disposed in the intersection point of workspace diagonals, wherein the actuators enclose an angle of 90 degrees with two hinge axes (68) of a cardan joint.

18. The machine tool according to claim 1, characterized in that the actuators have a rotation drivable nut (64) and a threaded spindle (62) shiftable in axial direction and fixed against rotation.

19. The machine tool according to claim 1, characterized in that the carrier (54) is formed as a spindle stock, wherein a work spindle (56) receiving tool and/or workpieces is supported in the spindle stock.

20. The machine tool according to claim 19, characterized in that a rotation axis of the work spindle (56) coincides with the alignment axis (58).

21. The machine tool according to claim 19, characterized in that a rotary angle position of the work spindle (56) is correctable.

22. The machine tool according to claim 1, characterized in that the carrier (54) supports a tool, wherein a work piece received by a work piece table (4) can be milled with the tool.

23. The machine tool according to claim 22, characterized by a spatially fixed first casing (12), which arches under the work piece table (4) and around the coupler drive and the drive device, and a swing away second casing (16), wherein the second casing (16) arches over the work piece table (4) to form a cockpit like overall casing (18).

24. The machine tool according to claim 23, characterized in that at least the second casing (16) is transparent.

25. The machine tool according to claim 1, characterized in that a weight balancing device, formed as a compression spring, is disposed between two members of one of the four bar chains (40, 42).

* * * * *

UNITED STATES PATENT AND TRADEMARK OFFICE
CERTIFICATE OF CORRECTION

PATENT NO. : 6,540,458 B1
DATED : April 1, 2003
INVENTOR(S) : Achim Ponisch

It is certified that error appears in the above-identified patent and that said Letters Patent is hereby corrected as shown below:

<u>Title page,</u>
Item [73], Assignee, should read -- StarragHeckert GmbH
Chemnitz (DE) --

Signed and Sealed this

Twenty-seventh Day of July, 2004

JON W. DUDAS
*Acting Director of the United States Patent and Trademark Office*